G. E. RIBLET.
CUTTING TOOL.
APPLICATION FILED JULY 2, 1909.
1,003,066.
Patented Sept. 12, 1911.
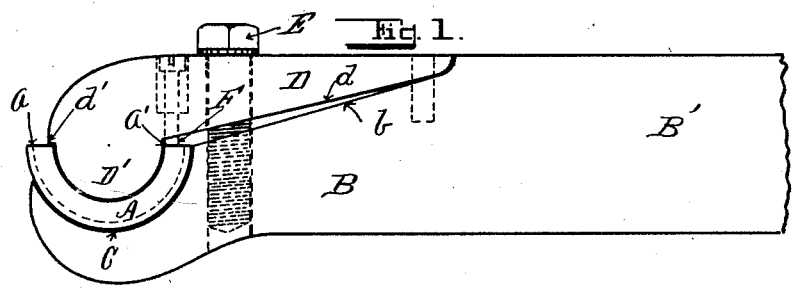
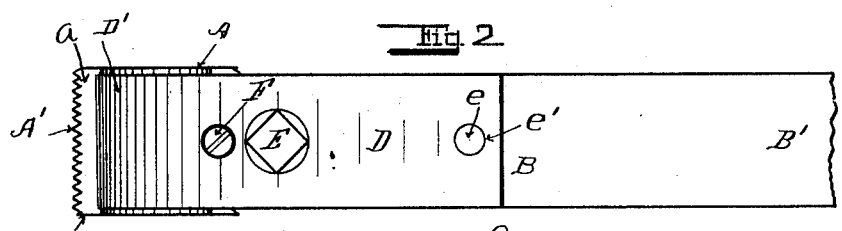
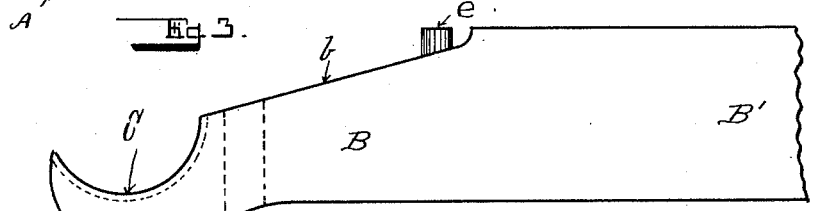
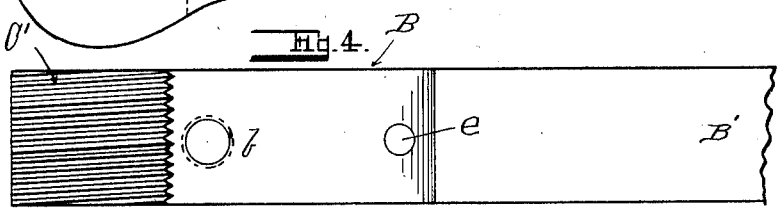
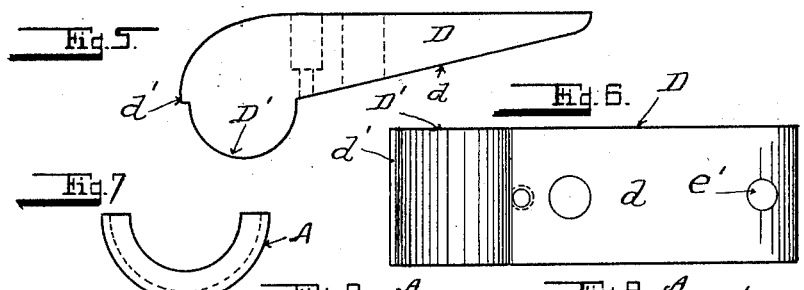
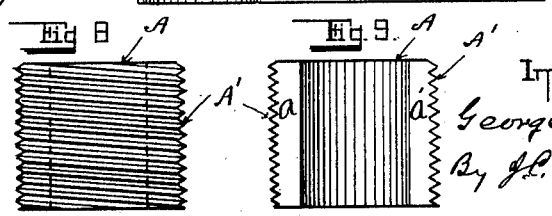
Witnesses.
Florence Stockert
G. J. Mead
Inventor.
George E. Riblet
By J. L. & H. M. Sturgeon
Attys.
COLUMBIA PLANOGRAPH CO., WASHINGTON, D. C.

UNITED STATES PATENT OFFICE.

GEORGE E. RIBLET, OF ERIE, PENNSYLVANIA.

CUTTING-TOOL.

1,003,066.  Specification of Letters Patent.  Patented Sept. 12, 1911.

Application filed July 2, 1909. Serial No. 505,658.

*To all whom it may concern:*

Be it known that I, GEORGE E. RIBLET, a citizen of the United States, residing at Erie, in the county of Erie and State of Pennsylvania, have invented certain new and useful Improvements in Cutting-Tools; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to thread-cutting tools suitable for use in thread-cutting dies, wherein a plurality of such thread-cutting tools are simultaneously employed, each of which follows the preceding tool in its revolution around the circumference of the cylinder around which the threads are being cut. This operation has heretofore been usually accomplished by means of a plurality of cutting tools secured radially in a chuck-ring, so that their cutting ends will meet at the center of the chuck-ring, the inner ends of said tools being provided with threads having cutting points along one side of said tool. The difficulty experienced with this form of thread cutting tool is that when one of the cutting tools in a thread cutting die becomes dulled and is ground back farther than the other tools used therewith in said chuck-ring, the threads thereon will not register perfectly with the thread-grooves made by the preceding tool.

The object of my invention is to overcome this difficulty by producing a thread-cutting tool that can be ground back as its thread-points become dulled, and then be replaced in its holder in a thread-cutting chuck, when it will exactly register with the thread-grooves cut by the tool immediately preceding it in its revolutions. To this end I construct a cutting member in the form of a semi-cylinder, having screw-threads of a pitch similar to the threads desired to be cut by said tool on its outer surface or periphery, and cutting points at each end or edge of said semi-cylinder, and I also construct a tool-holder for said cutting member having an internally screw-threaded semi-cylindrical recess to receive the externally threaded semi-cylindrical cutting member, and I have provided means whereby the forward movement of said cutting member within its holder may be limited, and all parts of said tool securely clamped together.

The features of my invention are hereinafter fully set forth and explained and illustrated in the accompanying drawings in which:

Figure 1 is a side view in elevation of my improved cutting tool and tool-holder. Fig. 2 is a top or plan view of the same. Fig. 3 is a side view in elevation of one member thereof. Fig. 4 is a top or plan view of the same. Fig. 5 is a side view in elevation of the other member thereof. Fig. 6 is a plan view of the under side of the same. Fig. 7 is an end view in elevation of my improved cutting tool. Fig. 8 is a view in elevation showing the outer surface of the cutting tool. Fig. 9 is an inside view in elevation of the same.

In these drawings, A is a screw-cutting tool made in the form of a segment of a tube, having a thread A' cut on the periphery thereof, so that the ends $a$ $a'$ thereof form the cutting faces of the tool. The faces $a$ $a'$ of this cutting tool may be ground off from time to time as the corners of the threads A' wear away, and so renew the life of the tool until it is two thirds or more worn away.

B indicates one member of a tool-holder and is provided with a shank B' suitable to be secured in a die-plate or other tool-holder as desired; the outer end of the member B is provided with an inclined surface $b$, at the outer end of which there is a circular recess C provided with an internal screw-thread C' adapted to fit the thread A' on the cutting-tool A, as is clearly shown in Figs. 1 and 2.

D indicates the other member of the tool-holder, and is provided with an inclined surface $d$ adapted to fit against the inclined surface $b$ of the member B, and at its outer end it is provided with a curved projection D', adapted to fit against the inner surface of the cutting tool A, as illustrated in Figs. 1 and 2. On the curved surface D' there is a shoulder $d'$ to form a guide against which one of the cutting faces $a$ or $a'$ of the tool A abuts, as shown in Fig. 1.

The member D is secured to the member B by means of a tap-bolt E passing through the member D into the member B. A stud-pin $e$ is also preferably provided in the member B which passes through a hole $e'$ in the member D. In the member D there is also provided an adjusting screw F, the inner end of which abuts against one of the faces $a$ or $a'$ of the cutting tool A, as illustrated in Fig. 1.

In operation the tool A is secured in the tool-holder so that one of the cutting faces $a$ or $a'$, as the case may be, abuts against the shoulder $d'$ on the tool-holder. Then the tool-holder being properly secured in a die-plate, or other suitable tool-holder (not shown) the tool A will operate as a thread-cutting die until the corners of the threads thereon become worn and dulled, when the tool A can be ground back on an emery wheel, or other device, until the cutting points of the peripheral threads thereon again present good sharp cutting edges. It may be that it has been necessary to grind back the tool A an appreciable distance, but this is compensated for by turning the semi-cylindrical cutting member A within the internally threaded semi-cylindrical recess in the holder, until the cutting edge of the cutting member A again engages the shoulder $d'$ which operates to slightly move the thread-cutter A transversely across the tool-holder within the semi-cylindrical recess, so that the thread-cutting points still occupy the same position with relation to the other like thread-cutting tools employed in conjunction therewith in a thread-cutting die, as said points did before they were sharpened, when the clamping means are again operated to securely fasten said tool upon the intermeshing screw-threads in the semi-cylindrical recess.

I have thus shown and described a cutting tool and tool-holder embodying a feature of my invention. It is obvious, however, that my invention can as readily be utilized for other cutting purposes than the cutting of screw-threads, without departing from the spirit thereof.

Therefore what I claim as new and desire to secure by Letters-Patent is:

1. The combination in a thread-cutting tool, of a semi-cylindrical thread-cutting member, circumferential screw threads on the periphery thereof terminating in thread-cutting points at the ends of said cutting member, a holder therefor having a semi-cylindrical recess, screw threads in said recess adapted to receive the screw threads on the periphery of the cutting member, a clamp-jaw adapted to engage the concave surface on the cutting member, a shoulder on the front end of said clamping jaw adapted to limit the upward movement of the cutting end of said cutting member, substantially as set forth.

2. The combination in a thread-cutting tool, of a semi-cylindrical thread-cutting member, circumferential screw threads on the periphery thereof terminating in thread-cutting points at the ends of said cutting member, a holder therefor having a semi-cylindrical recess, screw threads therein adapted to receive the screw threads on the periphery of the cutting member, a clamp-jaw to engage the concave surface on the cutting member, a shoulder on the front end of said clamp jaw adapted to limit the upward movement of the cutting end of said cutting member, and an adjustable stop adapted to contact with the rear end of said cutting member to prevent upward movement thereof, substantially as set forth.

3. The combination in a thread-cutting tool, of a semi-cylindrical thread-cutting member, circumferential screw threads on the periphery thereof terminating in thread-cutting points at the ends of said cutting member, a tool holder having a semi-cylindrical recess therein, screw threads therein adapted to receive the screw threads on the periphery of said cutting member, a clamp-jaw adapted to engage the concave surface on said cutting member, a shoulder on the front end of said jaw adapted to limit the upward movement of the front end of said cutting member, an adjustable stop to limit the upward movement of the rear end of said cutting member, and a clamp bolt to clamp said parts together, substantially as set forth.

In testimony whereof I affix my signature in presence of two witnesses.

GEORGE E. RIBLET.

Witnesses:
H. M. STURGEON,
GEO. E. GIBSON.

---

Copies of this patent may be obtained for five cents each, by addressing the "Commissioner of Patents, Washington, D. C."